United States Patent
Takeshima et al.

(10) Patent No.: US 7,968,490 B2
(45) Date of Patent: Jun. 28, 2011

(54) METHOD FOR PRODUCING POROUS SUBSTANCES

(75) Inventors: Shinichi Takeshima, Numazu (JP); Akio Koyama, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 675 days.

(21) Appl. No.: 11/631,174

(22) PCT Filed: Jul. 11, 2005

(86) PCT No.: PCT/JP2005/013198
§ 371 (c)(1),
(2), (4) Date: Dec. 29, 2006

(87) PCT Pub. No.: WO2006/006708
PCT Pub. Date: Jan. 19, 2006

(65) Prior Publication Data
US 2009/0031536 A1    Feb. 5, 2009

(30) Foreign Application Priority Data
Jul. 13, 2004   (JP) .................. 2004-206530

(51) Int. Cl.
*B01J 23/00* (2006.01)
*B01J 23/10* (2006.01)
*C01G 25/02* (2006.01)

(52) U.S. Cl. ........ 502/302; 502/303; 502/304; 502/300; 423/594.12

(58) Field of Classification Search .......... 502/300–355; 423/594.12
See application file for complete search history.

(56) References Cited

U.S. PATENT DOCUMENTS

| | | | |
|---|---|---|---|
| 5,023,071 | A | 6/1991 | Sherif |
| 5,254,797 | A | 10/1993 | Imoto et al. |
| 5,670,088 | A | 9/1997 | Chittofrati et al. |
| 5,863,850 | A | 1/1999 | Nawa et al. |
| 6,083,467 | A | 7/2000 | Takeshima et al. |
| 2002/0061816 | A1 | 5/2002 | Uenishi et al. |
| 2003/0109588 | A1 | 6/2003 | Schmidt et al. |
| 2004/0171483 | A1 | 9/2004 | Takeshima |

(Continued)

FOREIGN PATENT DOCUMENTS

EP   1 479 651 A1   11/2004

(Continued)

OTHER PUBLICATIONS

Eriksson et al. "Preparation of catalysts from microemulsion and their applications in heterogenous catalysis", Applied Catalysis A: General 265 (2004) 207-219.*

Pang et al. "Aluminum oxide nanoparticles prepared by water-in-oil microemulsions", J. Mater. Chem., 2002, 12, 3699-3704.*

Tartaj et al. "Microstructural Evolution of Iron-Oxide-Doped Alumina Nanoparticles Synthesized from Microemulsions", Chem. Mater. 2002, 14, 536-541.*

(Continued)

*Primary Examiner* — Stanley Silverman
*Assistant Examiner* — Anthony J Zimmer
(74) *Attorney, Agent, or Firm* — Oliff & Berridge, PLC

(57) ABSTRACT

A porous substance producing method for producing a porous substance; by holding particles for precursors of the porous substance in micelles or inverse micelles kept in a dispersed state in a solvent with a surfactant; by agglomerating the particles of the micelles or inverse micelles to each other; and by baking the agglomerated particles. The method comprises the step of agglomerating the particles of the micelles or inverse micelles to each other by performing a treatment to resolve the dispersed state of the micelles or inverse micelles containing the particles for the precursors, with the surfactant.

13 Claims, 4 Drawing Sheets

U.S. PATENT DOCUMENTS

2004/0234439 A1    11/2004    Takeshima et al.

FOREIGN PATENT DOCUMENTS

| JP | A-02-175602 | 7/1990 |
| JP | A-07-246343 | 9/1995 |
| JP | A-09-086907 | 3/1997 |
| JP | A 2001-170487 | 6/2001 |
| JP | A 2002-220228 | 8/2002 |
| JP | 2005-262126 A | 9/2005 |
| JP | 2006-026485 A | 2/2006 |
| JP | 4148025 B2 | 7/2008 |
| JP | 4407408 B2 | 11/2009 |
| WO | WO 02/094716 A1 | 11/2002 |

OTHER PUBLICATIONS

Balint et al. "Morphology and oxide phase control in the microemulsion mediated synthesis of barium stabilized alumina nanoparticles", Phys. Chem. Chem. Phys., 2002, 4, 2501-2503.*

Material Safety and Data Sheet for 95% Ethanol. Fisher Scientific UK. Created Jul. 27, 1999. Modified Dec. 12, 2006. https://extranet.fisher.co.uk.*

Toshiyuki Masui et al.: "Characterization and catalytic properties of $CeO_2$-$ZrO_2$ ultrafine particles prepared by the microemulsion method," Journal of Alloys and Compounds, Elsevier Sequoia, Lausanne, CH, vol. 269, No. 1-2, May 1, 1998, pp. 116-122.

* cited by examiner

METHOD FOR PRODUCING POROUS SUBSTANCES

TECHNICAL FIELD

This invention relates to a method for producing a porous substance to be used in a catalyst or the like for purifying the exhaust gas of an internal combustion engine.

BACKGROUND ART

It is known that a composite oxide having mesopores is used as one example of the porous substance in an exhaust gas purifying catalyst. In JP-A-2001-170487, for example, there is described a porous substance, which is used as the exhaust gas purifying substance having such a structure but not a substantially fibrous structure that the pores have a center diameter of 2 nm to 100 nm, and are formed at least partially into a three-dimensional mesh shape and communicate at random with each other. There is also described a method for producing the porous substance, in which a precipitate of a hydroxide of a metal such as aluminium or magnesium is formed and is baked after rinsed and dried. In JP-A-2002-220228, moreover, there is further a method for producing oxide powder of a porous substance, in which a precipitate of precursors of a solid solution of $CeO_2$-$ZrO_2$ is separated out and baked.

In the prior art, on the other hand, a microemulsion method is known as a method for producing a composite oxide to be used as the exhaust gas catalyst. In this method, a reaction such as a hydrolysis is caused inside or at the boundary of micelles or inverse micelles either to produce primary particles or precursors of a porous substance and secondary particles or the agglomerate of those primary particles or to form a precipitate, and the agglomerate or precipitate of the secondary particles is baked after rinsed and dried.

The methods, as described in JP-A-2001-170487 and JP-A-2002-220228, precipitate the metal for a carrier of the catalyst, and are enabled to control the pore diameter and the pore distribution to some extent by adjusting the concentration of an aqueous solution. However, the methods cannot make the separation in a state carrying precious metal particles having a catalytic activation. Therefore, the catalytic particles carried may cause a sintering at the prevailing high temperature, and their activity may become lower.

On the contrary, the microemulsion method forms primary particles of the carrier in the state, where the ions of a metal to function as the catalyst are incorporated into the inside or the boundary of the micelles or inverse micelles dispersed in a solvent by a surfactant, or makes the agglomeration of the primary particles and the secondary particles agglomerated from the primary particles. As a result, the microemulsion method can produce a catalyst of a porous structure suppressing the sintering of particles having a catalytic activity.

In the microemulsion method of the prior art, however, the agglomeration of the secondary particles is caused by the slow collisions of the micelles or inverse micelles resulting from their Brownian movements and by the agglomeration of the secondary particles due to the accompanying fusion by the van der Waals force of the secondary particles. In case the pores are placed, after baked, in a high-temperature atmosphere, therefore, their volume is not especially changed, but their diameter is highly changed. In this sense, the heat resistance is not necessarily sufficient. This phenomenon is believed to come from the following phenomenon. In the case of an exposure to a high temperature, the sintering is promoted at the portion of a high surface energy because the force binding the secondary particles is weak. As a result, the particles are bound to each other while crushing the diametrically small pores. After all, the peak of the pore distribution changes to the larger diameter side so that the substantial surface area of the porous substance is reduced.

DISCLOSURE OF THE INVENTION

This invention has been conceived by noting the technical problems thus far described and has an object to provide a method for producing a porous substance, which is stable in a power distribution even if exposed to a high temperature.

In order to achieve the aforementioned object, according to this invention, there is provided a porous substance producing method for producing a porous substance; by holding particles for precursors of the porous substance in micelles or inverse micelles kept in a dispersed state in a solvent with a surfactant; by agglomerating the particles of the micelles or inverse micelles to each other; and by baking the agglomerated particles. The method comprises the step of agglomerating the particles of the micelles or inverse micelles to each other by performing a treatment to resolve the dispersed state of the micelles or inverse micelles containing the particles for the precursors, with the surfactant.

In this invention, moreover, the particles of the inverse micelles can be agglomerated by performing a treatment to resolve the dispersed state of the inverse micelles with the surfactant, after the particles were formed and grown in a water phase in the inverse micelles dispersed in an organic solvent by the surfactant.

In this invention, still moreover, the treatment may make the dispersed state, in which the micelles or inverse micelles are dispersed, into a two-liquid separated phase of an oil phase and a water phase by reducing the relative concentration of the surfactant.

Alternatively, the treatment may also add a substance for reducing the surface activation of the surfactant. Specifically, polar small molecules having solubility to both an organic solvent and water are added in a micro quantity.

Moreover, the porous substance to be produced in this invention is exemplified such that the particles for the precursors are composite oxide particles having adsorbed metallic ions.

According to this invention, therefore, the so-called "reaction field" for producing the particles or the precursors of the porous substance or for growing them by an agglomeration is retained in a dispersed state as the micelles or inverse micelles, thereby to produce the so-called "secondary particles" having such a complicated structure as made by a further agglomeration of the agglomerate of those particles. In this procedure, the dispersed state of the micelles or inverse micelles by the surfactant is resolved to agglomerate the secondary particles quickly. This state imitates a treatment for eliminating the factors for separating the secondary particles by coalescing the reaction field separated in the form of micelles or inverse micelles. As a result, the secondary particles separated in the micelle or inverse micelle form are agglomerated abruptly and strongly. This results in the production of the porous substance, which is either strong in the porous structure of the porous substance obtained by baking that agglomerates through the rinsing and drying treatments or high in the binding strength of their component particles. Thus, it is possible to produce the porous substance, which has little change in the pore diameter and distribution even exposed to the high-temperature atmosphere.

According to this invention, moreover, at the agglomerating time of the so-called "secondary particles", the substance such as the surfactant to exist between the secondary particles can be eliminated or reduced to produce the porous substance, which is more excellent in the high-temperature stability or heat resistance of the porous structure or distribution.

According to this invention, still moreover, the aforementioned secondary particles are agglomerated in the presence of the surfactant so that their agglomeration can be softened to some extent. As a result, it is possible to make the pore distribution wider and the pore volume larger.

According to this invention, furthermore, it is possible to produce the porous substance, which can be used as an exhaust gas purifying catalyst and which is excellent in the high-temperature stability.

BEST MODE FOR CARRYING OUT THE INVENTION

Figure 1:
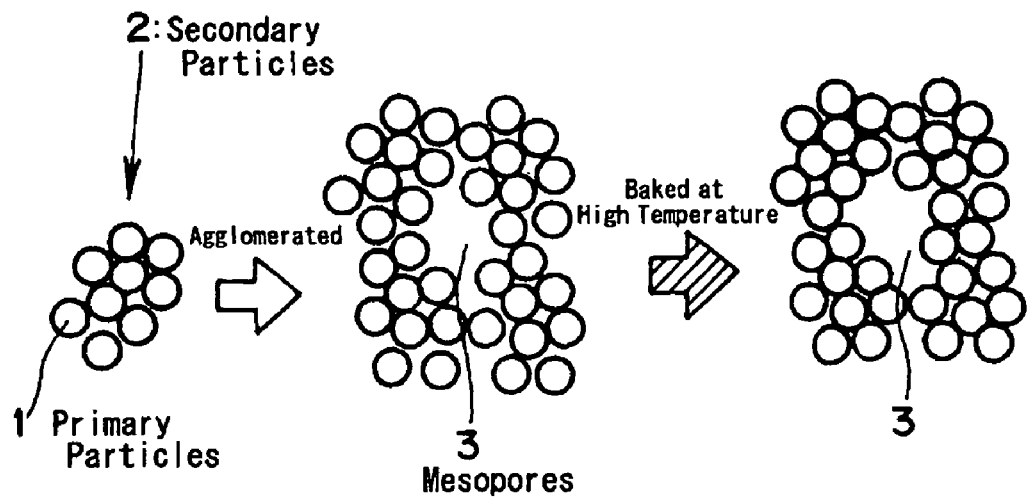
FIG. 1 is a schematic diagram showing a structure of a porous composite oxide according to a method of this invention.

This invention is exemplified by a method which can be adopted for producing a porous composite oxide to be used as an exhaust gas purifying catalyst, i.e., a production method according to the so-called "microemulsion method" utilizing micelles or inverse micelles. Therefore, the formation/growth of the so-called "primary particles" or the precursors of a porous substance, and secondary particles agglomerated from the primary particles is caused in the micelles or inverse micelles, and the secondary particles having grown to some size are further agglomerated. This is schematically shown in FIG. 1. The primary particles 1 have a size of about 5 to 15 nm and are agglomerated to form the secondary particles 2, which are further agglomerated in their growing procedure. These secondary particles 2 are agglomerated to each other to have a complicated agglomerate shape. In case the secondary particles 2 are agglomerated to each other unlike the mere agglomeration of the primary particles 1, therefore, mesopores 3 having a diameter of about 5 to 30 nm are formed between the secondary particles 2.

Especially in the method of this invention, the agglomeration of the secondary particles 2 between the secondary particles 2 contained in either the micelles or the inverse micelles and the secondary particles 2 contained in the other micelles or inverse micelles is caused not by awaiting the fusion (or coalescence) of the micelles or inverse micelles but by resolving the dispersed state of the micelles or inverse micelles by a surfactant thereby to release, as called so, the secondary particles 2 into the common reaction field. As a result, the secondary particles 2 are quickly agglomerated to have a strong bonding. Even in the case of heating to a high temperature, the pore structure or distribution is hardly changed to improve the so-called "heat resistance or high-temperature stability" of the porous substance or the porous composite oxide. It is believed that the agglomeration of the secondary particles 2 is positively or forcibly caused so that the highly active particles or portions relate to the agglomeration of the secondary particles 2.

The porous substance to be produced by the method of this invention is not limited to the composite oxide. In case the porous composite oxide is to be produced by this invention, its kind should not be especially limited but may be a composite oxide containing at least a first metallic element and a second metallic element. The family of the composite oxide is well known from may texts and handbooks. The composite oxide such as oxides of many metallic elements of alumina, zirconia, ceria, silica, iron oxide, manganese oxide, chromium oxide yttrium oxide can be almost formed by adding to it the second or subsequent metallic elements. It is known per se what combination of elements forms the composite oxide. This invention can be applied to all those composite oxides so long as a hydrolytic material or an inorganic metallic salt is present.

This composite oxide can be exemplified by a cerium-zirconium composite oxide. This composite oxide has a crystal structure of zirconium oxide $ZrO_2$, of which the zirconium is partially replaced by cerium. In the prior art, the cerium oxide is carried together with a catalytic metal on a carrier. When a catalyst is used at a high temperature, therefore, the oxygen storage capacity (OSC) of the cerium oxide drops according to the crystal growth of the cerium oxide. By using the cerium as the composite oxide, however, the deterioration of the OSC can be suppressed even for the use at the high temperature. Moreover, the composite oxide of this invention has pores of sufficient sizes after it was baked at the high temperature, so that it can diffuse even HC (Hydrocarbons) of large molecules in a Diesel exhaust gas into the carrier thereby to purify the HC by exhibiting the OSC.

Another example is exemplified by a composite oxide of a rare metal such as lanthanum and zirconium. When the zirconium in the crystal structure of zirconium oxide is partially replaced by lanthanum, oxygen defects having no oxygen in the crystal lattice are formed, because the zirconium is tetravalent whereas the lanthanum is trivalent. When an alkaline metal is added to that composite oxide, electrons are donated to the oxygen defects. The oxygen defects thus donated with electrons exhibit a strong basicity so that the electron-donated oxygen defects constitute strong base points. Nitrogen monoxide in the exhaust gas is trapped by those strong base points so that it is much adsorbed by the composite oxide. In short, this composite oxide has a NOx occluding action and can be used in a NOx occluding/reducing catalyst. Moreover, this lanthanum-zirconium composite oxide retains the sufficiently large pores even after caked at the high temperature so that it can diffuse the exhaust gas quickly thereby to make the exhaust gas purification efficiently.

In case the porous composite oxide is produced by the production method of this invention, the primary particles of the composite oxide or the precursors of the porous substance are formed, and a plurality of relatively small secondary particles of about 100 nm are formed from those primary particles and are then agglomerated. If the primary particles are formed to have a high concentration in the reaction system, they are agglomerated as a whole to form large secondary particles. In this invention, therefore, when the primary particles are formed and agglomerated, their entire agglomeration is suppressed. At first, relatively small secondary particles of about 100 nm are formed and agglomerated to form pores between them. Various operations can be carried out for suppressing the entire agglomeration of the primary particles.

These operations may retain physical spaces between the relatively small secondary particles to suppress their collisions, or may raise the concentration of the relatively small secondary particles or cations in a water phase holding the secondary particles thereby to make use of their electric repulsions.

According to the characteristics of a first mode of a method of this invention for producing the porous substance or the porous composite oxide, a solution prepared by dissolving in an organic solvent a compound of a first metallic element to be hydrolyzed for forming a hydroxide is mixed with an emulsion containing ions of a second or subsequent metallic element in a water phase in the inverse micelles formed in the organic solvent by a surfactant. At the boundary of the inverse micelles, the compound of the first metallic element is hydrolyzed, and the second or subsequent metallic element is introduced and polycondensed to form primary particles of the precursors of the composite oxide. In the system containing those primary particles, the primary particles are agglomerated to form secondary particles, and these secondary particles are agglomerated. At this hydrolysis, the fusion (or coalescence) between the inverse micelles is suppressed either by keeping the distance sufficiently between the inverse micelles or by establishing an electric repulsion between the inverse micelles while permitting their collisions, so that the secondary particles may grow during the suppression. After this, the dispersed state of the inverse micelles is resolved to cause the agglomeration between the secondary particles positively. Specifically, the dispersed state of the inverse micelles is resolved either by lowering the relative concentration of the surfactant to bring the dispersed phase into a two-part separated state or by adding polar small molecules of ethyl alcohol or the like to lower the surface actions of the surfactant.

The compound of the first metallic element hydrolyzed to form a hydroxide is called herein the first metallic compound. However, the metal for forming the first metallic compound implies not a metal of a narrow meaning but generally an element M capable of forming M-O-M bonds.

This first metallic compound can be exemplified by that which is generally used in the so-called "sol-gel method". This metallic compound is metallic alkoxide, acetylacetone metallic complex, metallic carboxylate, metallic carboxylate, metallic inorganic compound (e.g., nitrate, oxychloride or chloride), for example.

The metal element M for forming metallic alkoxide includes: elements of the first to fourteenth groups, sulfur, selenium and tellurium of the sixteenth group, and arsenic, antimony and bismuth. It is, however, said that platinum group elements and some lanthanide elements do not form any alkoxide. For example, silicon alkoxide or germanium alkoxide is called the metallic alkoxide. These metallic alkoxides are easily available, because various metallic alkoxides are sold in the market and because their producing methods are well known.

The hydrolysis of metallic alkoxides $M(OR)_n$ (wherein M: a metal, and R: an alkyl group such as methyl, ethyl, propyl or butyl) is known and is typically expressed by:

$$M(OR)_n + nH_2O \rightarrow M(OH)_n + nROH;$$

then

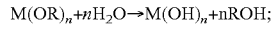

The hydrolysis of acetyl-acetone metallic complex $(CH_3COCH_2COCH_3)_nM$ (wherein M: a metal) is also known and is expressed by:

$$(CH_3COCH_2COCH_3)_nM + nROH \rightarrow nCH_3COCH_2C(OH)CH_3 + M(OH)_n;$$

then

These acetyl-acetone metallic complexes are easily available, because various metallic complexes are sold in the market and because their producing methods are well known. The acetyl-acetone metallic complexes are represented by more kinds such as aluminium acetonato, barium acetonato, lanthanun acetonato and platinum acetonato than those of alkoxides.

The organic metallic compounds such as the metallic alkoxides or the acetyl-acetone metallic complexes are easily dissolved by selecting a suitable solvent from alcohol, a polar organic solvent or a hydrocarbon solvent. It is preferred to use a hydrophobic (or oily) organic solvent which can be separated into two phases from a water phase.

The organic solvent is exemplified by hydrocarbons such as cyclohexane or benzene, straight-chain alcohol such as hexanol, or ketone such as acetone. The standards for selecting the organic solvent is not only the solubility of the surfactant but also the area (at a high molar ratio of water/surfactant) for forming the microemulsion.

It is known that the hydrolytic reaction of an organic metallic compound starts and progresses when water is added to the organic phase, which is prepared by dissolving the compound of a first metallic element hydrolyzed to form a hydroxide. Generally, a metallic hydroxide can be obtained by adding water to the organic phase containing the dissolved first metallic compound and by stirring the organic phase.

In this invention, an water in oil type emulsion containing the ions of the second or subsequent metallic element is formed in the water phase, which is finely dispersed in the organic phase with the surfactant, and the solution of the first metallic compound is added to that emulsion and is stirred and mixed so that the first metallic compound is made to react with the ions of the second or subsequent metallic element in the water phase enclosed by the surfactant in the inverse micelles. It is believed that the fine particles of the product can be obtained according to this method because the numerous inverse micelles become reaction nuclei or because the surfactant stabilizes the fine particles of the hydroxide produced.

It is also known in the aforementioned hydrolysis that the plural organic metallic compounds are hydrolyzed, when brought into contact with water, by dissolving the metallic compounds in the organic phase.

In this invention, one kind (including the compound of the first element) of those hydrolytic metallic compounds is made present in the organic phase, and the second metallic element and further the third or subsequent metallic element are made present as ions in the water phase in the inverse micelles when the organic phase and the water phase contact each other.

For making the ions in the water phase, it is possible to use water-soluble metallic salts, especially inorganic salts such as nitrate or chloride, and organic salts such as acetate, lactate or oxalate. The ions of the second element to exist in the water phase may be not only the simple ions of a metal but also the complex ions of the second element. A similar discussion similarly applies to the ions of the third or subsequent element.

When the organic phase and the water phase are brought into contact, the organic metallic compounds in the organic phase contact with the water so that they are subjected to a hydrolytic reaction to produce the hydroxide or oxide of the first metal. At this time, it has been found out that the ions of the metal existing in the water phase are incorporated according to the invention into the hydroxide (or oxide precursor) of the first metal (or the hydrolysis). This phenomenon is not known in the prior art. The reason why the ions in the water phase are incorporated into the hydroxide without any special precipitation is not sufficiently understood. This is described on the case, in which the first metallic compound is an alkoxide. It is believed the alkoxide is induced and hydrolyzed by the second metallic ions in the water phase, or that the hydrolyzed fine hydroxide of the alkoxide traps and agglomerates the metallic ions in a predetermined quantity in the water phase.

Especially in this novel production method, according to this invention, the ions of the second metallic element in the water phase are trapped in the hydroxide obtained by hydrolyzing the compound of the first metallic element in the organic phase. In the hydroxide obtained, the first metallic element and the second or subsequent metallic element are dispersed remarkably homogeneously. It has been found that the homogeneity is more prominently excellent than that of the alkoxide method of the prior art, by which a plurality of metallic alkoxides are present in the organic phase. In the composite oxide (or solid solution) obtained, the first metallic element and the second metallic element of the baked composite oxide are ideally mixed even at a relatively low baking temperature. This ideal mixing has never been achieved by the metallic alkoxide method of the prior art. In the metallic alkoxide method of the prior art, the stability is different among the kinds of the metallic alkoxide so that what is obtained between the first metallic element and the second metallic element is a heterogeneous product.

The ratio between the first metallic element and the second metallic element in the porous composite oxide obtained by the method of this invention can be adjusted by that between the quantity of the first metallic element and the quantity of the second metallic element in the organic phase.

It is preferred for this invention that the reaction system is the water in oil type emulsion system or microemulsion system. In this case, the first effect is due to the high hydrolyzing rate resulting from the fact that the microemulsion diameter is so extremely small as several nm to ten and several nm whereas the interface between the organic phase and the water phase is extremely wide (e.g., about 8,000 m²/liter for a diameter of 10 nm), and the second effect is due to the homogenization resulting from that the water phase is finely dispersed so that an extremely small number (e.g., about 100) of metallic ions are contained per one.

In this sense, the diameter of the water phase of the inverse micelles in the microemulsion is 2 to 20 mm, preferably 2 to 15 mm, more preferably 2 to 10 mm.

There is known the method for forming the water in oil emulsion system or microemulsion system. The organic phase solvent to be used can be exemplified by those like the aforementioned organic solvent, that is, hydrocarbons such as cyclohexane or benzene, straight-chain alcohol such as hexanol, and a ketone group such as acetone. The surfactant to be used in this invention can cover wide kinds such as a nonionic group surfactant, an anion group surfactant or a cation group surfactant, and can be used in combination with an organic phase component according to the application.

The nonionic group surfactant can be exemplified by a polyoxyethylene nonylphenyl ether group represented by polyoxyethylene (n=5) nonyl phenyl ether, a polyoxyethylene octylphenyl ether group represented by polyoxyethylene (n=10) octylphenyl ether, a polyoxyethylene alkyl ether surfactant represented by polyoxyethylene (n=7) cetyl ether, and a polyoxyethylene sorbitan group surfactant represented by polyoxyethylene sorbitan trioleate.

The anion group surfactant can be exemplified by di-2-ethylene hexyl sulpho sodium succinate, and the cation group surfactant can also be exemplified by cetyl trimethyl ammonium chlorite or cetyl trimethyl ammonium bromide.

The production method of this invention prefers the water in oil type emulsion system or microemulsion system but can be carried out by an in-water oil type emulsion system.

In case a composite oxide of three or more elements is produced by this invention, the third or subsequent element is made present in the water phase in the inverse micelles. This is because a plurality of hydrolytic metallic compounds make, if present in the organic phase, a heterogeneous product because of a difference in stability. Despite of this fact, however, the metallic compound of the third element may be present in the organic phase, if the homogeneity is needed between the first metallic element and the second metallic element but not between the first metallic element and the third metallic element.

The inverse micelles containing the ions of the second metallic element can be formed by the injection method, in which the aforementioned surfactant is dissolved in the aforementioned organic phase medium and in which an aqueous solution containing the ions of the second metallic element is added to the solution of the surfactant and stirred.

Thus, the solution of the first metallic compound and the inverse micelles containing the ions of the second metallic element in the water phase are made to contact with each other, so that the primary particles of the precursors of the composite oxide containing the first metallic element and the second metallic element are formed by the hydrolysis. After this, the system containing those primary particles is left and aged at a predetermined temperature (e.g., 30° C. to 80° C.) for a predetermined time (e.g., 2 hours). At this aging step, the primary particles are agglomerated to form secondary particles. At this time, all the primary particles are not agglomerated to form large secondary particles, but the hydrolysis and the aging are so performed keeping the distance between the inverse micelles sufficiently, that relatively small secondary particles may once be formed and then be agglomerated to form pores of sufficient sizes between the secondary particles.

Figure 2:
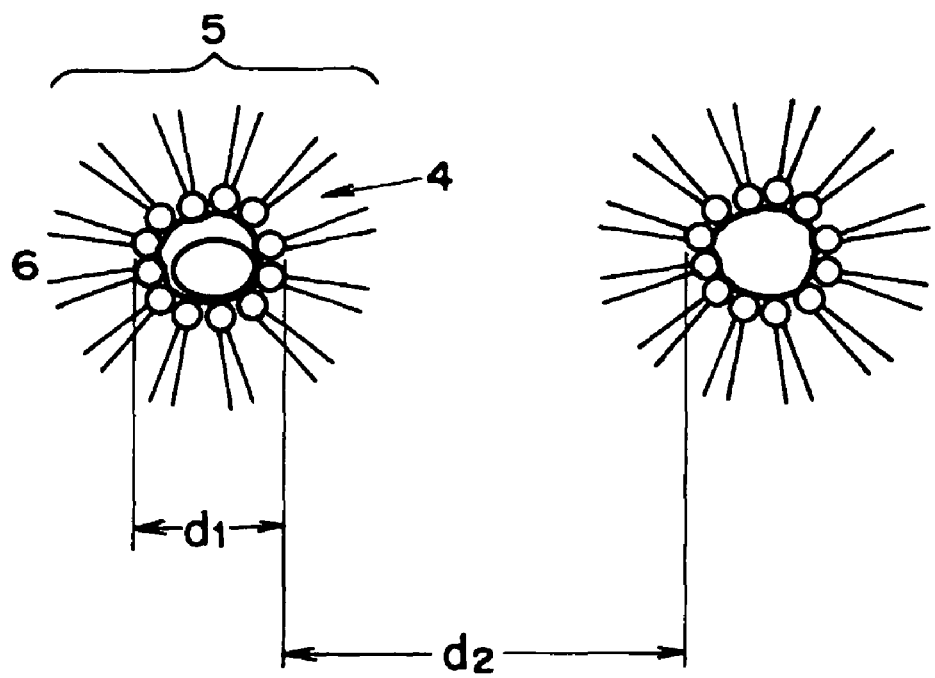
FIG. 2 is a schematic diagram showing the size of inverse micelles in the method of this invention and the distance between the inverse micelles.

As shown in FIG. 2, more specifically, inverse micelles 5 formed with a surfactant 4 having lipophilic groups outward and hydrophilic groups inward, and the ions of the second metallic element are contained in an inside water phase 6. Here, the water droplets are given a diameter $d_1$ of 5 nm, preferably about 10 nm, and a distance $d_2$ of 20 nm or more. The inverse micelles are always moved and diffused by the Brownian movement. In this invention, however, the volume of the organic phase with respect to that of the water phase is increased to keep the distance sufficient between the water droplets, i.e., between the inverse micelles. In order that all the primary particles may not be agglomerated to form large secondary particles, therefore, small secondary particles of a size of about 100 nm are formed while suppressing the agglomeration of the primary particles.

Figure 3:
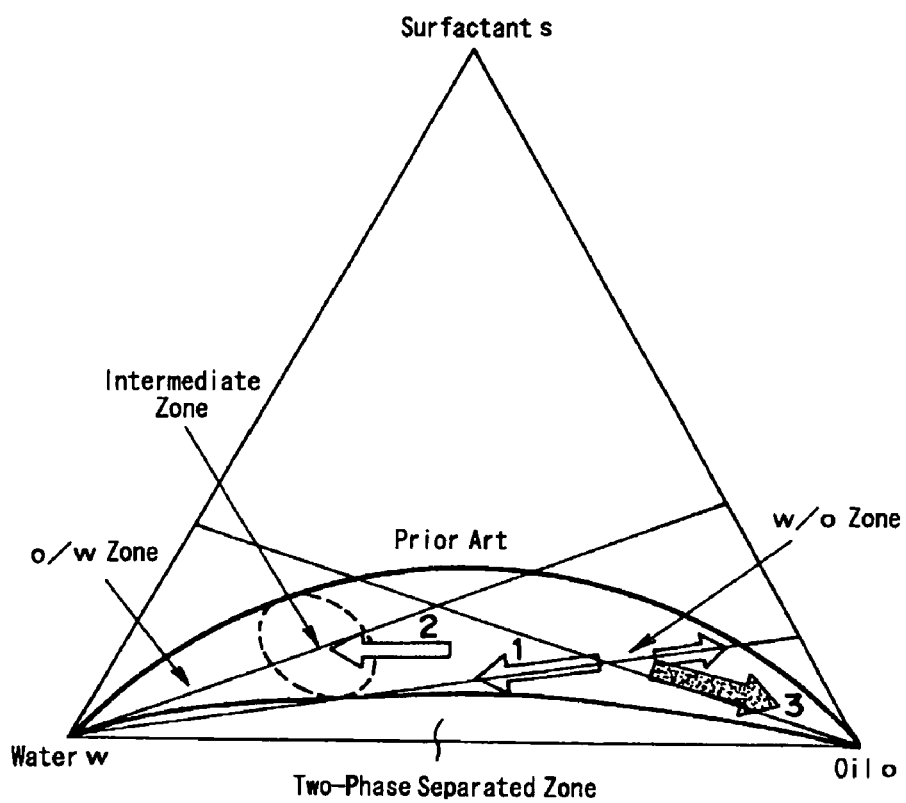
FIG. 3 is a three-phase map showing relations among water, a surfactant and oil in a microemulsion.

In the microemulsion containing the inverse micelles, the size of the water droplets of the inverse micelles and the distance between the water droplets are determined by three factors of the quantity of water, the quantity of oil, and the quantity of surfactant. FIG. 3 shows the using zones of water, oil and surfactant in the microemulsion. Moreover, the following Table 1 shows one example enumerating the influences the water droplet diameter and the inter-droplet distance of the inverse micelles in a three-phase map.

TABLE 1

Influences of Three-Phase Map on Water Droplet Diameters and Distances

| | Synthesizing Conditions | W/S | O/S | O/W | Droplet Dia.(nm) | Droplet Dist.(nm) |
|---|---|---|---|---|---|---|
| 0 | Base | 8.6 | 18 | 2.1 | 16.3 | 19.5 |
| 1 | Water Inc. | 16 | 18 | 1.1 | 18.0 | 14.8 |
| 3 | Oil Inc | 8.6 | 112 | 13 | 22.4 | 60.5 |
| 4 | Oil/Surfactant Inc. | 6.0 | 112 | 19 | 18.6 | 59.0 |
| 5 | Water/Oil Inc. | 10 | 55 | 5.5 | 21.0 | 38.6 |

Generally, a W/O type microemulsion is formed by the injection method to add water to a liquid containing a surfactant (or surfactant) dissolved in oil and to stir the solution. Thus, the increase in the molar ratio: W/S value (W value) between water and a surfactant is to increase the quantity of water. In the three-phase map of FIG. 3, a shift is made in the direction of→ "1". Under this condition, as shown in Table 1, the increase in the diameter of the water droplet is small, and the decrease in the inter-droplet distance is drastic. In this case, the agglomeration of the primary particles is high, and the secondary particles become large. When the water is increased, the map frequently enters not the intermediate zone but the two-phase separated zone. For establishing the intermediate zone of neither the W/O type nor the O/W type, it is necessary to increase the surfactant concentration beforehand.

Next, in case the map moves in the direction of→ "3" in FIG. 3, that is, in case the oil is increased, the droplet diameter becomes large, and the inter-droplet distance becomes drastically long. In this case, the W/O type microemulsion is not broken even by adding much oil, but the increases in the size of the water droplets and the inter-droplet distance can be freely changed with an excellent controllability. However, this controllability is still insufficient from the viewpoint of controlling the droplet diameter and the inter-droplet distance independently. By shifting the vector slightly, as shown in FIG. 4, it is possible to control the droplet diameter and the inter-droplet distance independently.

Figure 4:
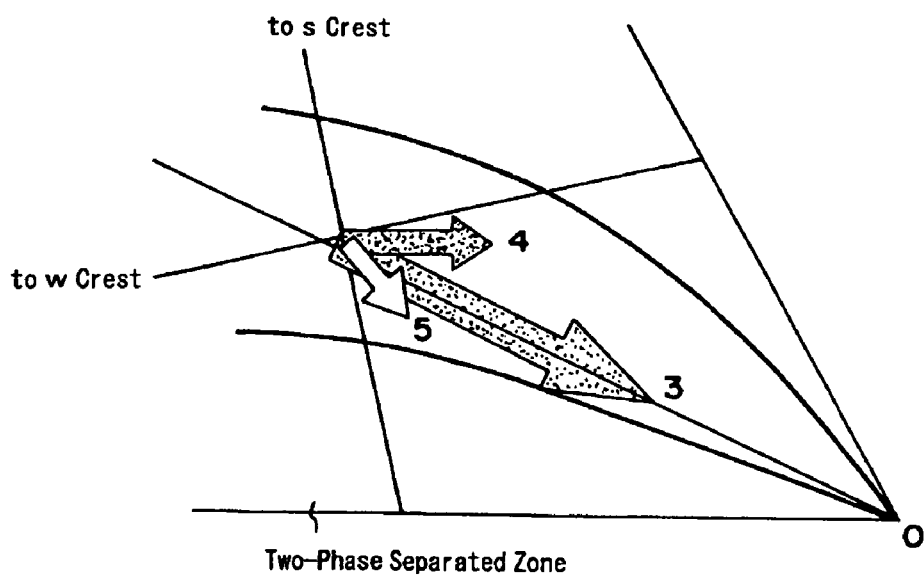
FIG. 4 is an enlarged diagram of a portion of FIG. 3.

When the map is moved in the direction of→ "4" by increasing the oil and raising the surfactant concentration, as shown in FIG. 4, the inter-droplet distance can be exclusively enlarged while leaving the droplet diameter unchanged. In case, on the other hand, the solution quantity is increased without changing the concentration of the ions in the water phase, that is, in case the map is moved in the direction of→ "5" by making the solution lean, the droplet diameter becomes larger, but the change in the inter-droplet distance is smaller. In this zone, however, both the water and the oil are increased relative to the surfactant. Therefore, the zone is narrow, and the state change is so sensitive to the position of the map. This sensitivity needs a precise adjustment.

In order that the large secondary particles may not be formed, it is necessary in this invention to increase only the distance between the water droplets without enlarging the water droplet diameter of the inverse micelles. It is apparent from the aforementioned results that both the droplet diameter and the inter-droplet distance are simultaneously increased by raising the ratio of the oil to the water and the surfactant. Specifically, it is advisable that the oil is increased to two times or more in a volume ratio to the water and to five times or more in a volume ratio to the surfactant.

On the other hand, the method for suppressing the fusion (or coalescence) between the inverse micelles so as to progress the production of the primary particles by the hydrolysis and the production of the secondary particles by the agglomeration of the primary particles may be exemplified by a method for increasing the concentration of cations in the water phase in the inverse micelles. Specifically, the concentration of cations excepting hydrogen ions (H+) in the water phase in the inverse micelles is set to 2 mols/liter. Then, the electric repulsion by the electric charge in the inverse micelles acts between the inverse micelles to suppress the fusion (or coalescence) between the inverse micelles and the according premature agglomeration between the primary particles or between the secondary particles.

When the organic phase and the water phase are hydrolyzed in contact, as described above, the hydroxide (or precursor) is generally produced. In this invention, the secondary particles or the precursors are produced in the micelles or the inverse micelles, and the dispersed state of the micelles or the inverse micelles is resolved to agglomerate the secondary particles each other positively. When the quantity of water and/or oil is increased to lower the concentration of the surfactant, as shown in FIG. 3, the dispersed phase is not maintained but replaced by a two-phase separated state. Specifically, the dispersed state of the micelles or the inverse micelles by the surfactant is broken or resolved. As a result, the internal secondary particles are released or discharged to the common reaction field so that they are positively agglomerated. Alternatively, polar small molecules are added to lower the activation of the surfactant. Specifically, a small quantity of an alcohol group, an glycol group or an aldehyde group having a small carbon number is added. Then, the microemulsion is broken to resolve the state, in which the secondary particles are enclosed, so that the agglomeration of secondary particles positively occurs.

The positive agglomeration is believed to be caused by the following reason. Specifically, those alcohols have short alkyl groups and OH bonds so that they basically have extremely high solubility to water and are dissolved to some extent into the organic phase. Therefore, the surfactant is organized to act on the surfactant-water hydrogen bonds important for forming the microemulsion, and these compounds are bonded in place of water so that the water-surfactant hydrogen bonds are instantly weakened to break the microemulsion with an extremely small quantity of addition. As a result, a wholly mixed single-phase system is created.

For this reason, an additive having a number "1" or "2" of carbons C is basically preferred. However, an additive having a carbon number "3" basically has a similar effect, if its quantity is more or less increased. An additive having a carbon number "4" or larger is not preferred, because it has little solubility to water. This addition of small quantity rather has an effect (as a co-surfactant) to stabilize the microemulsion and is therefore excluded from this invention.

Thus, the alcohol having a carbon number of "1" to "3" instantly breaks, even if added in an extremely small quantity, the microemulsion so that the secondary particles in the microemulsion are agglomerated as they are. In the case of the two-phase separation, it is believed, although not clearly understood, that the time period for the water to increase thereby to separate the water phase and the organic phase of the microemulsion is one to several seconds. In the case of this invention, however, it is believed that the microemulsion is broken instantly as the added alcohol or the like is homogenized.

It is also believed that the total quantity is not increased by that extremely little addition to the system, and that the agglomeration occurs with the surfactant being embraced. Therefore, the entirety has a large pore volume and a slightly broad pore distribution, which is preferred for the application of a catalyst of an automobile or the like. It is further believed suitable for the automotive catalyst that many pores are liable to have a size ranging from 10 to 20 nm.

The product thus obtained is baked, after dried, to produce a porous article or a porous composite oxide. The method for parting and drying the product may be identical to that of the prior art. The baking conditions are also like those of the prior art, and the baking temperature and the baking atmosphere may be selected according to the kind of a specific composite oxide. Generally speaking, however, the porous product can be baked at a lower temperature than that of the prior art. It is believed that the metallic element has been homogeneously dispersed in advance so that the energy to diffuse the metallic element into the solid can be lower.

According to the characteristics of a second mode of a method of this invention for producing the porous composite oxide, in a water phase inside of inverse micelles formed in an organic solvent by a surfactant, an aqueous solution containing the ions of a first metallic element and an aqueous solution containing the ions of a second or subsequent metallic element are mixed to react. The compound containing the first metallic element and the second or subsequent metallic element is precipitated and is hydrolyzed and polycondensed to form primary particles of precursors of a composite oxide. In a system containing the primary particles, the primary particles are agglomerated to form secondary particles, and these secondary particles are agglomerated. At this hydrolyzing time, the volume of an organic phase outside of inverse micelles is made larger than that of a water phase in the inverse micelles and that of a surfactant thereby to keep the distance sufficient between the inverse micelles. Alternatively, the concentration of cations excepting hydrogen ions in the water phase in the inverse micelles is increased (to 2 mols/liter or higher) thereby to promote the production of the secondary particles. After this, the secondary particles are agglomerated to resolve the dispersed state by the surfactant thereby to form sufficient pores between the secondary particles.

In the method of this second mode, the metallic elements, the surfactants and the organic solvents to be used are common to those in the method of the first mode. In this method of the second mode, both the first metallic element and the second or subsequent metallic element are made present as ions in the water phase in the inverse micelles, and the composite oxide is formed in the water phase by the so-called "co-precipitation" method.

Specifically, a solution of a salt of the first metallic element and a solution of a salt of the second metallic element are prepared, for example. As in the method of the first mode, a surfactant is dissolved in an organic solvent, to which the salt solution of the first metallic element and the salt solution of the second metallic element are added, thereby to form two kinds of inverse micelles individually containing those metallic element ions. Alternatively, two kinds of metallic element ions are contained in the inverse micelles of one kind. Separately, an aqueous solution of a precipitate is used to prepare inverse micelles likewise containing the precipitate in a water phase. This precipitate can be exemplified by that which is used in the co-precipitation method of the prior art, that is, by an alkali capable of neutralizing a metallic salt, such as ammonia, ammonium carbonate, sodium hydroxide, potassium hydroxide or sodium carbonate, or alcohol. Of these, the ammonia or ammonium carbonate to volatile at the subsequent baking time is especially preferred, and the pH of such alkaline solution is preferred to be 9 or higher.

The inverse micelles containing the ions of the first metal, the inverse micelles containing the ions of the second metal, or the inverse micelles containing both the ions of the first metal and the ions of the second metal, and the inverse micelles containing a precipitate, and, if necessary, the inverse micelles containing another third or subsequent metal are mixed in an organic solvent and are made to react in the water phase of the inverse micelles. Next, the reactant is aged by a method like that of the first mode thereby to form precursors of a composite oxide. At this time, either by adjusting the size of the individual inverse micelles and the distance between the inverse micelles by a method like that of the first mode, or by causing the inverse micelles to electrically repulse each other with the electric charges of the internal water phase, the agglomeration of primary particles in the composite oxide obtained is suppressed to restrict the size of the primary particles to be formed, so that a porous composite oxide having mesopores between the secondary particles can be obtained.

As compared with the method of the first mode, according to this method of the second mode, the dispersions of the metallic elements of two kinds are slightly lower in the composite oxide obtained, but the agglomeration of the primary particles can be controlled like the method of the first mode, so that the composite oxide obtained can have similar pores.

EXAMPLE 1

3.0 liters of cyclohexane and 224 g of polyoxyethylene (n=5) nonyl phenyl ether were introduced into a beaker having a content volume of 5 liters, and an aqueous solution of 52 g of cerium nitrate and 120 milliliters of distilled water was added and stirred. The solution was stirred at the room temperature by a magnetic stirrer to form inverse micelles (i.e., water in oil type microemulsion having a measured water droplet diameter of 30 nm). Separately of this, 0.23 mols of zirconium butoxide were dissolved in 0.8 liters of cyclohexane to prepare a zirconium alkoxide solution, and this solution was added the aforementioned microemulsion. The volume ratio (O/w) at this time of water (or water phase) to the cyclohexane (or organic phase) was 18. Instantly as this mixture was sufficiently stirred at the room temperature, the content of the beaker turned cloudy into a whitish yellow color to form colloidal particles (or secondary particles having a diameter of about 20 nm).

Next, in order to adjust the agglomeration of the colloid, the pH was adjusted to 8 with ammonia water, and distilled water was added to lower the relative concentration of the surfactant thereby to establish a two-phase separated state of the water phase and the organic phase. As a result, the dispersed state of the inverse micelles by the surfactant was resolved to proceed the agglomeration of the secondary particles held in the inverse micelles. The stirring operation was continued for about 1 hour to age the secondary particles. After this, the mother liquor was filtered separate, and the precipitation obtained was rinsed three times with ethanol, dried one night at 80° C., and baked at 600° C. and at 900° C. in the atmosphere for 5 hours to produce a porous composite oxide ($Ce_{0.4}Zr_{0.6}Ox$) containing cerium and zirconium. The molar ratio of Ce/Zr of the composite oxide was ⅔.

EXAMPLE 2

3.0 liters of cyclohexane and 224 g of polyoxyethylene (n=5) nonyl phenyl ether were introduced into a beaker having a content volume of 5 liters, and an aqueous solution of 52 g of cerium nitrate, 48.5 g of zirconium nitrate and 120 milliliters of distilled water was added and stirred. The solution was stirred at the room temperature by a magnetic stirrer to form microemulsion. Next, ammonia water was introduced into the microemulsion to adjust the pH to 7, and the stirring operation was continued to form colloidal particles. Subsequently, the pH was adjusted to 8.5, and distilled water was added to establish a two-phase separated state. The stirring operation was continued for about 1 hour to age the secondary particles. The precipitate obtained is treated as in Example 1 to form a porous composite oxide ($Ce_{0.4}Zr_{0.6}Ox$) containing cerium and zirconium.

EXAMPLE 3

The cerium-zirconium porous composite oxide ($Ce_{0.4}Zr_{0.6}Ox$) was formed as in Example 1 excepting that the breakage of the microemulsion was made by adding a substance for suppressing the activation of the surfactant in place of the two-liquid separating operation. Specifically, the pH was adjusted with ammonia water to 8 to form the primary particles by adjusting the agglomeration of colloids and to form the secondary particles by the agglomeration of the primary particles. At the same time, 10 milliliters of ethyl alcohol was added to break the microemulsion. In this state, the stirring operation was further continued for about 1 hour to age the secondary particles. The precipitate was treated as in Example 1 to form the porous composite oxide ($Ce_{0.4}Zr_{0.6}Ox$) containing cerium and zirconium.

EXAMPLE 4

This is an example for producing $La_{0.5}Zr_{0.5}O_{3.5}$ (having a pyrochlore structure). 3.0 liters of cyclohexane and 202 g of polyoxyethylene (n=5) nonyl phenyl ether were introduced into a beaker having a volume of 5 liters, and an aqueous solution of 52.4 g of lanthanum nitrate and 120 milliliters of distilled water was added and stirred. The solution was stirred at the room temperature by a magnetic stirrer to form inverse micelles (i.e., water in oil type microemulsion having a measured water droplet diameter of 40 nm). Separately of this, a zirconium-butoxide/cyclohexane solution was prepared and was added the aforementioned microemulsion. Simultaneously with this, the pH was adjusted to 7. The volume ratio (0/W) at this time of water (or water phase) to the cyclohexane (or oil phase) was 18. Moreover, the cation ion concentration in the water phase in the inverse micelles was set to 4.3 mols/liter or higher by adding buffering ammonium nitrate and ammonia. Instantly as this mixture was sufficiently stirred at the room temperature, the content of the beaker turned cloudy into a white color to form colloidal particles (or secondary particles having a diameter of about 25 nm).

Next, ammonia water, which had been diluted with water to adjust the agglomeration of colloids, was added to bring the map into the two-phase separated zone, and the pH was adjusted to 9. At this time, the secondary particles formed were instantly agglomerated in the water phase and were aged by continuing the stirring operation for about 1 hour. The mother liquor was filtered, and the precipitate obtained was rinsed three times with ethanol and dried at 80° C. for one night. After this, the precipitate was baked at 600° C. and at 800° C. in the atmosphere for 2 hours to form a composite oxide (i.e., lanthanum zirconia: $La_{0.5}Zr_{0.5O3.5}$) containing lanthanum and zirconium.

COMPARISON 1

8.6 liters of cyclohexane and 350 g of polyoxyethylene (n=5) nonyl phenyl ether were introduced into a beaker having a content volume of 15 liters, and an aqueous solution of 43 g of cerium nitrate and 120 milliliters of distilled water was added and stirred. The solution was stirred at the room temperature by a magnetic stirrer to form inverse micelles (i.e., water in oil type microemulsion having a measured water droplet diameter of 30 nm). Separately of this, 50 g of zirconium butoxide was dissolved in 0.8 liters of cyclohexane to prepare a zirconium alkoxide solution, and this solution was added the aforementioned microemulsion. The volume ratio (O/w) at this time of water (or water phase) to the cyclohexane (or organic phase) was 78. Instantly as this mixture was sufficiently stirred at the room temperature, the content of the beaker turned cloudy into a whitish yellow color to form colloidal particles (or secondary particles having a diameter of about 10 nm).

Next, in order to adjust the agglomeration of the colloid, the pH was adjusted to 8 with ammonia water. Moreover, the stirring operation was continued for about 1 hour for an aging purpose. The mother liquor was filtered separate, and the precipitation obtained was rinsed three times with ethanol, dried one night at 80° C., and baked at 600° C. and at 900° C. in the atmosphere for 5 hours to produce a porous composite oxide ($Ce_{0.4}Zr_{0.6}Ox$) containing cerium and zirconium. The molar ratio of Ce/Zr of the composite oxide was $2/3$.

COMPARISON 2

The method was identical to that of the aforementioned Comparison 1 excepting that the "cerium nitrate" in the aforementioned Comparison 1 was replaced by lanthanum nitrate, and that the baking operation was performed at 600° C.×2 hours and 800° C.×2 hours.

On the porous composite oxides obtained in the individual Examples and the individual Comparisons, the pore volumes after the baking operations were measured at the temperature of liquid nitrogen and by a nitrogen adsorption. The results of Examples 1 to 3 and Comparison 1 are presented in FIG. 5. The porous composite oxides according to Example 1 and Example 2 having performed the two-phase separating treatment in the agglomerating/aging procedures of the secondary particles had initial pore volumes larger by 10% or more than that of the porous composite oxide of Comparison 1 and sharper pore distributions. It is estimated that the agglomeration of the secondary particles was promptly caused at the synthesizing time so that the binding between the secondary particles was strengthened to increase the strength of the composite oxide as a whole. After the baking operation of 900° C., the peak of the pore diameter was hardly changed, and the reduction in the pore volume was a little. In the porous composite oxide of Comparison 1, on the contrary, the reduction in the pore volume was small, but the peak of the pore diameters shifted to the larger side. Specifically, it has been recognized that the porous composite oxides of Examples 1 and 2 are not subjected to the reduction of the surface area due to the crush of pores even when exposed to a high temperature so they are excellent in the high-temperature stability, but that the porous composite oxide of Comparison 1 is subjected to the crush of radially small pores so that its surface area is reduced.

Figure 5:
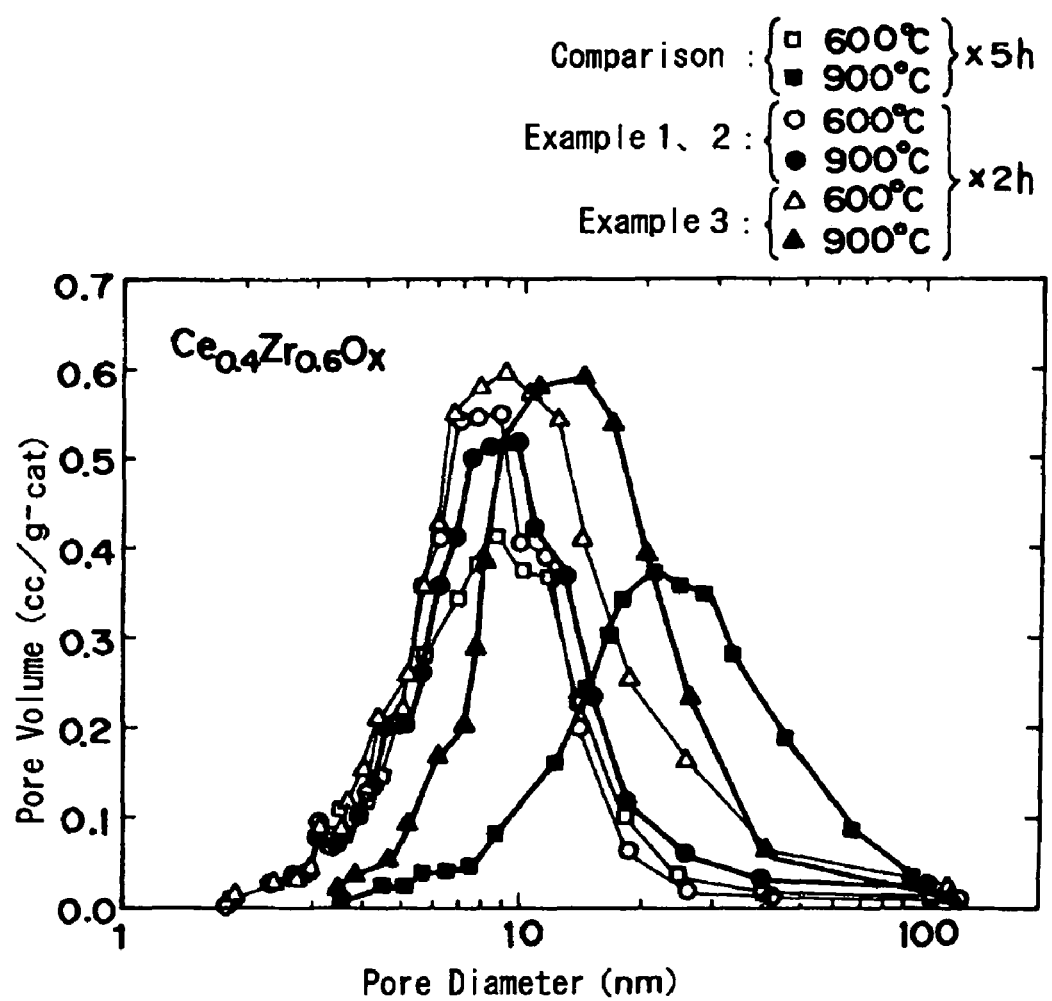
FIG. 5 is a diagram showing the measurement results of the pore distributions of the composite oxides obtained by Examples 1, 2 and 3 of this invention and by Comparison 1.

FIG. 5 shows that the pore volume is the larger for the larger area enclosed by polygonal lines. Hence, the porous composite oxide by Example 3 had the largest pore volume about 1.5 times as large as that of Comparison and about 1.2 times as large as that of Examples 1 and 2. It has also been recognized that the pore volume after the baking operation at 900° C. was hardly changed, that the change in the pore diameter for the peak pore volume was intermediate between those of Examples 1 and 2 of the two-phase separation and Comparison so that those of Examples are superior in heat resistance to that of Comparison. It has been found out that the porous composite oxide, after baked, according to Example 3 had a peak of about 15 nm of the pore diameter so that it is suitable for the catalyst of the automotive exhaust gas.

Figure 6:
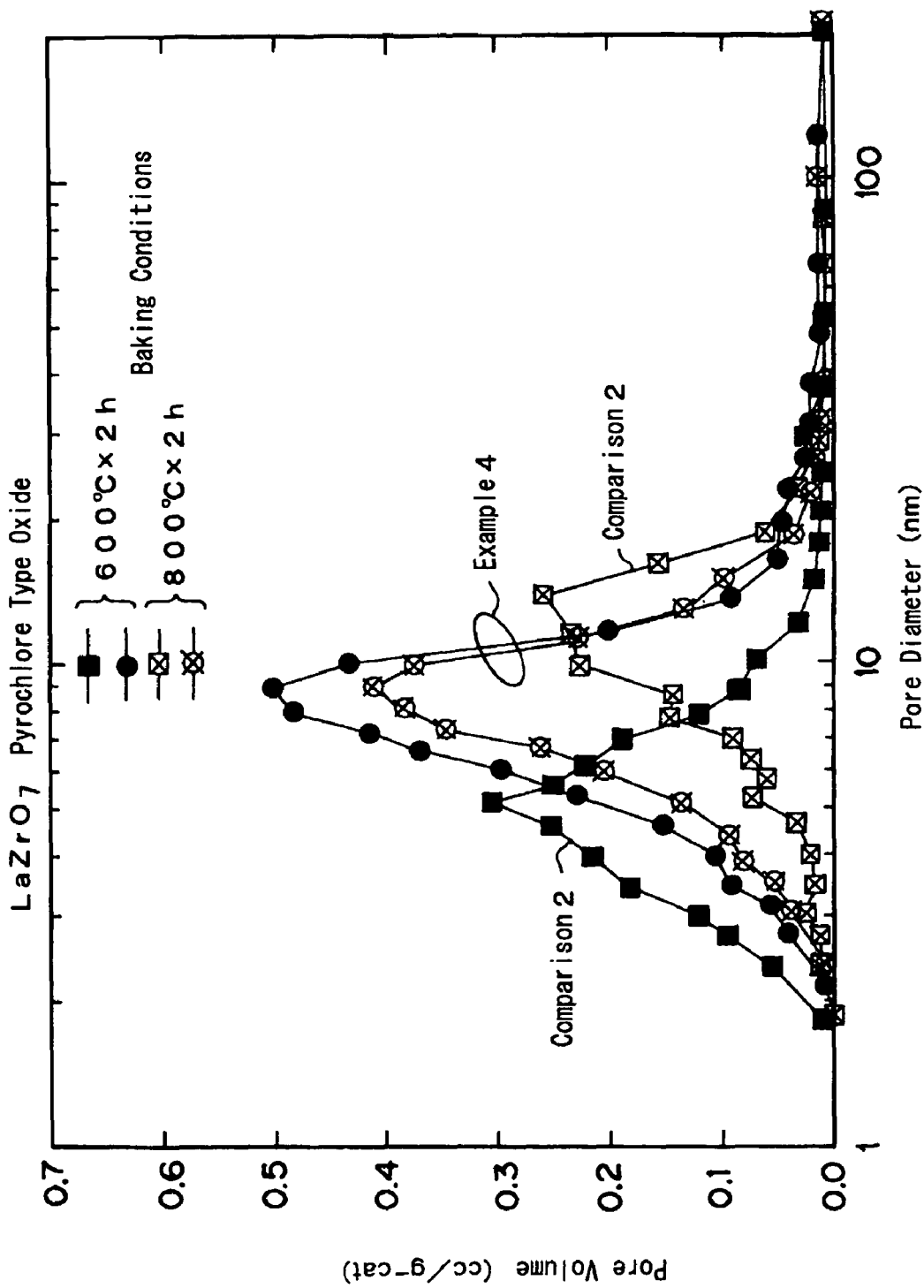
FIG. 6 is a diagram showing the measurement results of the pore distributions of the composite oxides obtained by Example 4 of this invention and by Comparison 2.

The results of Example 4 and Comparison 2 are shown in FIG. 6. Example 4 and Comparison 2 for the lanthanum zirconia or the pyrochlore type oxide had results similar to those of Examples 1 to 3 and Comparison 1 for the aforementioned composite oxide of cerium and zirconia. Specifically, the porous composite oxide according to Example 4 having performed the two-phase separating treatment in the agglomerating/aging procedures of the secondary particles had initial pore volumes larger than that of the porous composite oxide of Comparison 2 and sharper pore distributions. It is estimated that the agglomeration of the secondary particles was promptly caused at the synthesizing time so that the binding between the secondary particles was strengthened to increase the strength of the composite oxide as a whole. After the baking operation of 800° C., the peak of the pore diameter was hardly changed, and the reduction in the pore volume was a little. In the porous composite oxide of Comparison 2, on the contrary, the reduction in the pore volume was small, but the peak of the pore diameters shifted to the larger side. Specifically, it has been recognized that the porous composite oxide of Examples 4 is not subjected to the reduction of the surface area due to the crush of pores even when exposed to a high temperature so they are excellent in the high-temperature stability, but that the porous composite oxide of Comparison 2 is subjected to the crush of radially small pores so that its surface area is reduced.

The invention claimed is:

1. A method for producing a porous substance, the method comprising:
(a) holding a phase comprising secondary particles of the porous substance in micelles or inverse micelles in a dispersed state in a solvent with a surfactant;
(b) agglomerating the secondary particles held in the micelles or inverse micelles by adjusting pH of microemulsion at room temperature from 7 to 9, and thereafter performing a treatment to resolve the dispersed state of the micelles or inverse micelles containing the secondary particles; and
(c) baking the agglomerated secondary particles;
wherein:
the treatment to resolve the dispersed state comprises adding a small polar molecule that is soluble in both an organic solvent and water and that reduces the surface activation of the surfactant, the small polar molecule is at least one member selected from the group consisting of alcohols having 1 to 3 carbon atoms, glycols having 1 to 3 carbon atoms, and aldehydes having 1 to 3 carbon atoms; and
the secondary particles held in the micelles or inverse micelles are agglomerated to form mesopores having a diameter of 5 to 30 nm between the secondary particles, the secondary particles are composite oxide particles in which metallic ions are incorporated, and the secondary particles include cerium-zirconium composite oxide or lanthanum-zirconium composite oxide.

2. The method according to claim 1, wherein:
step (b) is performed after the secondary particles are formed and grown in an aqueous phase in the inverse micelles where the inverse micelles are dispersed in an organic solvent with the surfactant.

3. A method for producing a porous substance, the method comprising:
(a) holding a phase comprising secondary particles of the porous substance in micelles or inverse micelles in a dispersed state in a solvent with a surfactant;
(b) agglomerating the secondary particles held in the micelles or inverse micelles by adjusting pH of microemulsion at room temperature from 7 to 9, and thereafter performing a treatment to resolve the dispersed state of the micelles or inverse micelles containing the secondary particles; and
(c) baking the agglomerated secondary particles;
wherein:
the treatment to resolve the dispersed state comprises dispersing the micelles or inverse micelles into a two-liquid separated phase comprising an oil phase and an aqueous phase by reducing the relative concentration of the surfactant by adding water; and
the secondary particles held in the micelles or inverse micelles are agglomerated to form mesopores having a diameter of 5 to 30 nm between the secondary particles and the secondary particles include cerium-zirconium composite oxide or lanthanum-zirconium composite oxide.

4. The method according to claim 1, wherein:
a diameter of an aqueous phase of the inverse micelles is 2 to 20 nm.

5. The method according to claim 1, wherein:
a distance between the inverse micelles in step (a) is 20 nm or more.

6. The method according to claim 1, wherein:
a diameter of the secondary particles contained in the micelles or inverse micelles is within a range of 10 to 25 nm.

7. The method according to claim 3, wherein:
a diameter of the secondary particles contained in the micelles or inverse micelles is within a range of 10 to 25 nm.

8. The method according to claim 1, wherein:
the agglomerated secondary particles are aged for one to two hours at 30° C. to 80° C.

9. The method according to claim 3, wherein:
the agglomerated secondary particles are aged for one to two hours at 30° C. to 80° C.

10. The method according to claim 8, wherein:
the aged secondary particles are rinsed with ethanol and dried at 80° C. for one night, and thereafter baked for two to five hours at 600° C. to 900° C.

11. The method according to claim 9, wherein:
the aged secondary particles are rinsed with ethanol and dried at 80° C. for one night, and thereafter baked for two to five hours at 600° C. to 900° C.

12. The method according to claim 1, wherein:
molar ratio of the cerium-zirconium composite oxide obtained by dividing a mole number of cerium by a mole number of zirconium is ⅔.

13. The method according to claim 3, wherein:
molar ratio of the cerium-zirconium composite oxide obtained by dividing a mole number of cerium by a mole number of zirconium is ⅔.

* * * * *